United States Patent
Takanashi et al.

(10) Patent No.: US 9,107,399 B2
(45) Date of Patent: Aug. 18, 2015

(54) METHOD FOR CONTROLLING INSECT PEST BY VIBRATION

(75) Inventors: Takuma Takanashi, Tsukuba (JP); Wakako Ohmura, Tsukuba (JP); Eiji Ohya, Tsukuba (JP); Yoshitaka Kubojima, Tsukuba (JP); Teruo Mori, Funabashi (JP); Takuji Koike, Choufu (JP); Hiroshi Nishino, Sapporo (JP)

(73) Assignees: Forestry And Forest Products Research Institute, Ibaraki (JP); The University Of Electro-Communications, Tokyo (JP); National University Corporation Hokkaido University, Hokkaido (JP)

( * ) Notice: Subject to any disclaimer, the term of this patent is extended or adjusted under 35 U.S.C. 154(b) by 633 days.

(21) Appl. No.: 13/394,892

(22) PCT Filed: Sep. 8, 2010

(86) PCT No.: PCT/JP2010/065398
§ 371 (c)(1),
(2), (4) Date: Mar. 8, 2012

(87) PCT Pub. No.: WO2011/030783
PCT Pub. Date: Mar. 17, 2011

(65) Prior Publication Data
US 2012/0167826 A1 Jul. 5, 2012

(30) Foreign Application Priority Data
Sep. 9, 2009 (JP) .................................. 2009-208413

(51) Int. Cl.
A01M 7/00 (2006.01)
A01M 29/22 (2011.01)

(52) U.S. Cl.
CPC ...................................... A01M 29/22 (2013.01)

(58) Field of Classification Search
USPC ........ 43/132.1, 138, 107; 367/139; 340/384.2
See application file for complete search history.

(56) References Cited

U.S. PATENT DOCUMENTS 4,097,838 A * 6/1978 Fiala .............................. 367/139
4,163,966 A * 8/1979 Mounce ........................ 367/139

(Continued)

FOREIGN PATENT DOCUMENTS

JP 2000-204684 7/2000
JP 2001-252002 9/2001

(Continued)

OTHER PUBLICATIONS

A. Hosomi, Control of Mulberry borer Damage by Artificial Vibration Stimulus of Fig Branch, The 39$^{th}$ Annual Meeting of the Japanese Society of Applied Entomology and Zoology: 116.

(Continued)

*Primary Examiner* — Christopher P Ellis
(74) *Attorney, Agent, or Firm* — Paul E. White, Jr.; Manelli Selter PLLC

(57) ABSTRACT

A method for controlling an insect pest with vibrations, including a step of determining a frequency range and an amplitude range of vibrations in a habitat medium of an insect pest that induce or suppress a specific behavior of the insect pest, and a step of controlling the insect pest behavior by applying vibrations in the frequency range and amplitude range once or two or more times in the insect pest habitat medium.

16 Claims, 2 Drawing Sheets

(56) References Cited

U.S. PATENT DOCUMENTS

| | | | | |
|---|---|---|---|---|
| 4,215,429 | A | * | 7/1980 | Riach ............................ 367/139 |
| 4,219,884 | A | * | 8/1980 | DeSantis ....................... 367/139 |
| 5,473,836 | A | * | 12/1995 | Liu ................................. 43/124 |
| 5,598,379 | A | * | 1/1997 | Malleolo ....................... 367/139 |
| 5,896,696 | A | * | 4/1999 | Stokes et al. .................... 43/124 |
| 6,166,996 | A | * | 12/2000 | Grissom et al. ............... 367/139 |
| 6,250,255 | B1 | * | 6/2001 | Lenhardt et al. .............. 119/713 |
| 6,301,194 | B1 | * | 10/2001 | Cauchy .......................... 367/139 |
| 7,707,767 | B2 | * | 5/2010 | Ragon et al. ................. 43/132.1 |
| 2008/0205674 | A1 | | 8/2008 | Onohara |
| 2012/0263021 | A1 | * | 10/2012 | Connell ........................ 367/139 |

FOREIGN PATENT DOCUMENTS

| | | |
|---|---|---|
| JP | 2001-294505 | 10/2001 |
| JP | 2006-311255 | 11/2006 |
| WO | WO 2007/095693 A1 | 8/2007 |

OTHER PUBLICATIONS

Akihiro Hosomi, Effect of Tree Vibration to the Infestation of *Apriona* japonica (THOMSON) (Coleoptera: Cerambycidae) Adults on the Fig, Japan Informal Group Meeting on Human response to Vibration held at the Hokkaido Safety and Health Service Center, JISHA, Sapporo, 064 Japan, Jul. 13 and Jul. 14, 1996.

Thomas Friedel, The Vibrational Startle Response of the Desert Locust *Schistocerca gregaria*, the Journal of Experimental Biology 202, 1999, pp. 2151-2159.

Eiji Ohya et al., Close range sound communications of the oak platypodid beetle Platyus quercivorus (Murayama) (Coleoptera: Platypodidae) Applied Entomology Zoology 36 (3), 2001, pp. 317-321.

Wakako Ohmura et al., Behavioral Analysis of Tremulation and Tapping of Termites (*Isoptera*), Sociobiology 2009, vol. 54, No. 1.

* cited by examiner

METHOD FOR CONTROLLING INSECT PEST BY VIBRATION

TECHNICAL FIELD

The present invention relates to a method for controlling insect pests with vibrations.

BACKGROUND ART

Vibrations are known to be an important and common signal for insects that cause behaviors such as repellence, attraction, mating, feeding, oviposition and the like. Therefore, it may be possible to control the behavior of various insect pests by artificially controlling a vibration signal.

Examples of such control include positive behavior control against beneficial insects and negative behavior control against insect pests. Examples of positive behavior control include the attraction to a target insect pest of natural enemies and predators used as an insect pest control resource, the attraction of pet insect beetles, and the settlement of honey bees, which are domesticated insects. Further, examples of negative behavior control include controlling an insect pest through repellence or by inhibiting its mating, feeding, oviposition and the like.

For example, an insect pest control method that uses vibrations that propagate through wood is an example of insect pest control that utilizes such behavior control. Since this method can be thought of as a physical control, it has the advantage of not suffering from the problem of chemical resistance, which is a universal problem for chemically synthesized pesticides, or the problem of having an adverse impact on the human body, the environment, or a non-target organism. Therefore, this method will contribute to the development of environmentally-friendly insect pest control technologies as a substitute for chemical agents that for a long time have been demanded by society due to the appearance of insect pests that have resistance to chemical agents and increased awareness about environmental and food safety.

As examples of vibration-based insect pest control, Non-Patent Documents 1 and 2 disclose attempts to control the mulberry borer by inhibiting a feeding behavior and an oviposition behavior with fig branch vibrations.

Further, Patent Documents 1 and 2 disclose a control device for house insect pests that uses ultrasounds.

However, including insect pest control, there are no examples of a desired objective being achieved by controlling insect pest behavior with vibrations. The reasons for this include, for example, the fact that correct knowledge concerning the relationship among vibration parameters including frequency in insects that exhibit behaviors by detecting vibrations has been lacking, and the fact that it is difficult to determine the frequency and amplitude of the vibrations that control a specific behavior of an insect due to the difficulty of scrutinizing the effects of vibrations that were generated spontaneously (spontaneous vibrations) in the habitat medium of the insect.

As described above, despite the demands by society for a method that controls the behavior of insects with vibrations, especially a method that controls insect pests, such a method has yet to be established.

PRIOR ART DOCUMENTS

Patent Documents

[Patent Document 1] Japanese Patent Application Laid-Open No. 2001-252002
[Patent Document 2] Japanese Patent Application Laid-Open No. 2000-204684
[Patent Document 3] Japanese Patent Application Laid-Open No. 2001-294505

Non-Patent Documents

[Non-Patent Document 1] A. Hosomi, (1995) "Control of Mulberry Borer Damage by Artificial Vibration Stimulus of Fig Branch", Abstract of the 39th Annual Meeting of the Japanese Society of Applied Entomology and Zoology: 116
[Non-Patent Document 2] A. Hosomi, "Effect of Vibration to the Infestation of *Apriona japonica* (Thomson) (Coleoptera: Cerambycidae) Adults on the FIG.", Japan Informal Group Meeting on Human Response to Vibration held at the Hokkaido Safety and Health Service, 13 to 14 Jul. 1996. 25-34 1996
[Non-Patent Document 3] T. Friedel, "The Vibration Startle Response of the Desert Locust *Schistocerca gregaria*", Journal of Experimental Biology 202: 2152-2159 (1999)
[Non-Patent Document 4] E. Ohya et al., "Close Range Sound Communications of the Oak Pltatypodid Beetle *Platypus quercivorus* (Maruyama) (Coleoptera: Platypodiae)", Applied Entomology and Zoology 36(3): 317-321 (2001)
[Non-Patent Document 5] W. Ohmura et al., "Behavioral Analysis of Tremulation and Tapping of Termites (*Isoptera*)", Sociobiology 54(1): 269-274 (2009)

SUMMARY OF THE INVENTION

Problems to be Solved by the Invention

Accordingly, it is an object of the present invention to establish and provide a method for controlling an insect pest with vibrations.

Means for Solving the Problems

As a result of continued intensive research to resolve the above-described problems, the present inventors clarified that insect behavior cannot be adequately controlled by only considering frequency as a vibrations parameter, and discovered that the above-described problems can be resolved by additionally controlling other parameters. Based on further intensive research, the present inventors completed the present invention.

Specifically, the present invention relates to a method for controlling an insect behavior with vibrations, comprising:

a step of determining a frequency range and an amplitude range of vibrations in a habitat medium of the insect pest that induce or suppress a specific behavior of the insect pest; and a step of controlling the insect pest behavior by producing vibrations in the frequency range and amplitude range once or two or more times in the insect pest habitat medium.

Further, the present invention relates to the method according to claim 1, wherein the frequency range is 5 Hz to 5 kHz.

In addition, the present invention relates to the above-described method, wherein the frequency range is 25 Hz to 1 kHz.

Still further, the present invention relates to the above-described method, wherein the amplitude range is 0.001 m/s$^2$ or more.

Still further, the present invention relates to the above-described method, wherein the amplitude range is 0.05 m/s$^2$ to 100 m/s$^2$.

Further, the present invention relates to the above-described method, wherein vibrations of a duration of 5 s or less are applied at least once. In addition, the present invention relates to the above-described method, wherein vibrations are applied two or more times, and an interval between applying vibrations is 100 ms or more to 100 s or less.

Further, the present invention relates to the above-described method, wherein vibrations are directly applied on the habitat medium.

Further, the present invention relates to the above-described method, wherein the habitat medium is a plant or a structure, and vibrations are applied to the plant or structure by applying vibrations to a contact area supporting the plant or structure.

In addition, the present invention relates to the above-described method, wherein the vibrations are produced in the habitat medium of an insect pest using a super-magnetostrictive element.

Further, the present invention relates to the above-described method, wherein the insect pest behavior that is controlled is one type or two or more types selected from search, orientation, arrest, aggregation, feeding, mating, oviposition, escape, freezing, and warning.

In addition, the present invention relates to the above-described method, further comprising a step of determining a frequency range of vibrations that are generated in a habitat medium of an insect pest.

In addition, the present invention relates to the above-described method for controlling an insect pest, wherein the insect pest is a forest, wood, or fruit tree insect pest, a house, sanitary, or stored grain insect pest, or an agricultural insect pest.

Still further, the present invention relates to the above-described method for controlling an insect pest, wherein the insect pest is the long-horned beetle, bark beetle, powder-post beetle, deathwatch beetle, Japanese rhinoceros beetle, or psylla.

Even further, the present invention relates to the above-described method for controlling an insect pest, wherein the insect pest is one or two or more species of insect pest selected from the Japanese pine sawyer and related species (*Monochamus*), the Asian long-horned beetle and related species (*Anoplophora*), the yellow-spotted longicorn beetle (*Psacothea hilaris*), the mulberry borer (*Apriona japonica*), the cryptomeria bark borer (*Semanotus japonicus*), the oak platypodid beetle and related species (*Platypus*), the spruce bark beetle and related species (*Ips, Dendroctonus*), the powder-post beetle and related species (*Lyctus*), *Nicobium hirtum* and related species (*Nicobium, Ernobius*), the coconut rhinoceros beetle and related species (*Oryctes*), and the Asian citrus psylla and related species (*Diaphorina*).

Further, the present invention relates to the above-described method for controlling an insect pest, wherein the insect pest is one or two or more species selected from among termites or cockroaches.

In addition, the present invention relates to the above-described method for controlling an insect pest, wherein the insect pest is one or two or more species of insect pest selected from the Formosan subterranean termite and related species (*Coptotermes*), the Japanese subterranean termite and related species (*Reticulitermes*), the western drywood termite and related species (*Incisitermes*), the Daikoku drywood termite and related species (*Cryptotermes*), the Nevada damp-wood termite (*Zootermopsis nevadensis*), the smoky-brown cockroach, the American cockroach and related species (*Periplaneta*), and the German cockroach and related species (*Blattella*).

Further, the present invention relates to the above-described method for controlling an insect pest, comprising using a super-magnetostrictive element to produce vibrations in a habitat medium of the insect pest.

In addition, the present invention relates to the above-described method for controlling an insect pest, wherein a frequency range of the vibrations is 5 Hz to 5 kHz and an amplitude range of the vibrations is 0.001 m/s$^2$ or more.

Further, the present invention relates to the above-described method for controlling an insect pest, wherein the insect pest is the Japanese pine sawyer.

Advantages of the Invention (1) The method according to the present invention enables insect pests to be controlled, since vibration conditions that are optimal for a desired objective are specified and set in advance.
(2) The method according to the present invention can control a specific insect pest more efficiently by setting a frequency range to 5 Hz to 5 kHz.
(3) The method according to the present invention can control a specific insect pest still more efficiently by setting a frequency range to 25 Hz to 1 kHz.
(4) The method according to the present invention can control a specific insect pest even more efficiently by setting an amplitude range to 0.001 m/s$^2$ or more.
(5) The method according to the present invention can control a specific insect pest even more efficiently by setting an amplitude range to 0.05 m/s$^2$ to 100 m/s$^2$.
(6) The method according to the present invention can control a specific insect pest more efficiently by applying vibrations of a duration of 5 s or less at least once.
(7) The method according to the present invention can avoid adaptation (habituation) to vibrations by a control target insect pest species, reduce a load on a vibration exciter and the like due to reduced power consumption, and control the insect pest more efficiently by applying vibrations two or more times, in which an interval between applying the vibrations is 100 ms or more to 100 s or less.
(8) The method according to the present invention can control a target insect pest more efficiently by directly applying vibrations to the habitat medium.
(9) The method according to the present invention can control a specific insect pest more efficiently by, when the habitat medium is a plant or a structure, applying the vibrations to the plant or structure by applying vibrations to a contact area supporting the plant or structure.
(10) The method according to the present invention can control the frequency more precisely and control an insect pest in an inexpensive and power-saving manner by using a super-magnetostrictive element to produce the vibrations in the insect pest habitat medium.
(11) The method according to the present invention can control a specific insect pest more efficiently by controlling one or two or more insect pest behaviors selected from search, orientation, arrest, aggregation, feeding, mating, oviposition, escape, freezing, and warning.
(12) The method according to the present invention can control a specific insect pest more efficiently by further including a step of determining a frequency range of vibrations that occur in a habitat medium of an insect pest, as this enables the employed frequency range to be more precisely determined.
(13) The method according to the present invention can efficiently control various insect pest species such as a forest, wood, or fruit tree insect pest, a house, sanitary, or stored grain insect pest, or an agricultural insect pest.

(14) The method according to the present invention can efficiently control long-horned beetles, bark beetles, powder-post beetles, and deathwatch beetle.

(15) The method according to the present invention can efficiently control one or two or more species of insect pest selected from the Japanese pine sawyer and related species (*Monochamus*), the Asian long-horned beetle and related species (*Anoplophora*), the yellow-spotted longicorn beetle (*Psacothea hilaris*), the mulberry borer (*Apriona japonica*), the cryptomeria bark borer (*Semanotus japonicus*), the oak platypodid beetle and related species (*Platypus*), the spruce bark beetle and related species (*Ips, Dendroctonus*), the powder-post beetle and related species (*Lyctus*), *Nicobium hirtum* and related species (*Nicobium, Ernobius*), the coconut rhinoceros beetle and related species (*Oryctes*), and the Asian citrus psylla and related species (*Diaphorina*).

(16) The method according to the present invention can efficiently control termites or cockroaches.

(17) The method according to the present invention can efficiently control one or two or more species of insect pest selected from the Formosan subterranean termite and related species (*Coptotermes*), the Japanese subterranean termite and related species (*Reticulitermes*), the western drywood termite and related species (*Incisitermes*), the Daikoku drywood termite and related species (*Cryptotermes*), the Nevada damp-wood termite (*Zootermopsis nevadensis*), the smoky-brown cockroach, the American cockroach and related species (*Periplaneta*), and the German cockroach and related species (*Blattella*).

(18) Further, since the method for controlling an insect pest according to the present invention that uses a super-magnetostrictive element to produce vibrations in the habitat medium of the insect pest has a very broad frequency control range, the method can control insect pests and habitat environments (ordinary trees, fruit trees, ornamental trees garden trees, bonsai trees, seedlings, roadside trees, natural forests, artificial forests, crops, houses and the like) across a broad frequency band.

(19) The method for controlling an insect pest according to the present invention can more efficiently control a specific insect pest by setting the frequency range of the vibrations to 5 Hz to 5 kHz and the amplitude range of the vibrations to 0.001 m/s$^2$ or more.

(20) The method for controlling an insect pest according to the present invention can efficiently and safely control the Japanese pine sawyer.

As described above, it is known that insect behavior is controlled when an insect detects vibrations, especially vibrations of a specific frequency and amplitude (Non-Patent Document 3). Further, as described above, examples of attempts to control an insect pest using vibrations are also known (Non-Patent Documents 1 and 2). However, it was not known until now that for such control it is essential to specify the vibration frequency and amplitude that are required to control insect pest behavior, and to precisely control that frequency and amplitude. Moreover, no adequate control effect has ever been proven based on such a control attempt. Therefore, enabling an insect pest to be controlled with vibrations, which is an advantageous effect of the present invention, is a remarkable effect that could not have been expected based on the conventional art.

DEFINITIONS

Figure 1:
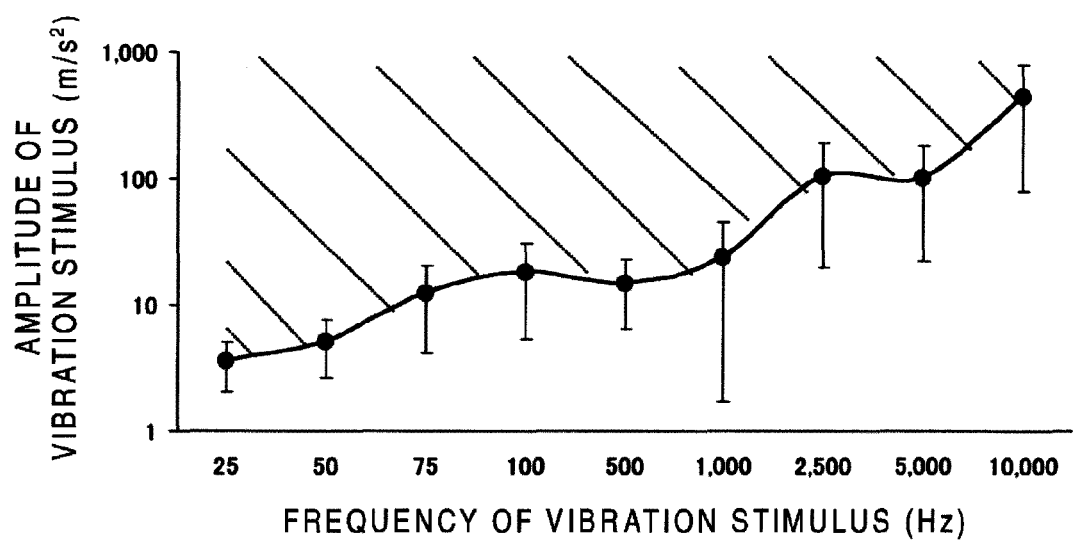
FIG. 1 is a graph illustrating a threshold of warning, sound generation, and freezing behavior in response to a vibration stimulus applied to Japanese pine sawyer. In the hatched region drawn in the upper portion of the graph, Japanese pine sawyer behavior is controlled.

In the present invention, the term "habitat medium" means any substrate in which insects live or occur. This term encompasses any substrate, including living organisms such as plants and animals, as well as structures such as buildings and soil. Further, in laboratory experiments, the term "habitat medium" includes artificial media other than substrates in which a target insect lives or is settled in a natural environment.

Further, in the present invention, the term "vibration" means something that is propagated through a substrate other than air as a medium. Therefore, although "vibration" in the present invention does not include the sound per se that is a stimulus on hearing, for which air is the medium, this term does include the vibrations in the medium that produce the sound. In the present invention, the expression "control an insect pest" includes, in addition to reducing the habitat density of an insect pest in a habitat medium, reducing the damage to the habitat medium by the insect pest (feeding damage, transmission of other harmful organisms etc.).

The method according to the present invention is a method for controlling an insect pest with vibrations, which includes the following steps (a) and (b):

(a) A step of determining a frequency range and an amplitude range of vibrations in a habitat medium of an insect pest that induce or suppress a specific behavior of the insect pest.

(b) A step of controlling the insect pest behavior by producing vibrations in the frequency range and amplitude range once or two or more times in the insect pest habitat medium.

These steps will now be described in more detail.

Step (a) is, as stated above, a step of determining a frequency range and an amplitude range of vibrations in a habitat medium of a control target insect pest that induce or suppress a specific behavior of the insect pest.

The frequency range and amplitude range can be determined by specifying, for example, a target insect pest species and a behavior that is targeted for control, applying vibrations consisting of a combination of various frequencies and amplitudes on the insect pest using a signal generator and a vibration exciter, observing and recording the behavior, and specifying the combination of frequency and amplitude thresholds that control this behavior.

The insect pest behavior that is targeted for control is not especially limited. Examples thereof may include search, orientation, arrest, aggregation, feeding, mating, oviposition, escape, freezing, and warning. The site where the vibrations are produced may be the actual habitat medium where the target insect pest is settled, or may be some other medium, such as a contact area that propagates the vibrations to the habitat medium.

The vibration frequency range is not especially limited. This frequency range may be, for example, 5 Hz to 5 kHz, and 20 Hz to 1 kHz is preferred. Further, a vibration frequency range that includes all or a part of the frequency band defined as a "sweep" or "noise" is also effective, and is in fact preferred.

Further, it is preferred to combine two or more frequencies, as this is effective in avoiding adaptation. Examples of combined frequencies include a frequency of 5 Hz to 1 kHz and a frequency of 1 kHz to 5 kHz, a frequency of 20 Hz to 500 kHz and a frequency of 500 kHz to 1 kHz or the like.

The vibration amplitude range is also not especially limited, and may be set based on the target insect pest species and the behavior that is targeted for control, for example. A preferred example of this amplitude range is 0.001 m/s$^2$ or more, more preferred is a range of 0.01 m/s$^2$ to 100 m/s$^2$, still more preferred is a range of 0.05 m/s$^2$ to 100 m/s$^2$, and especially preferred is a range of 0.05 m/s$^2$ to 10 m/s$^2$.

Therefore, a combination of a frequency range and an amplitude range that combines the above frequency ranges and amplitude ranges is preferred. For example, a combination of a frequency range of 5 Hz to 5 kHz and an amplitude range of 0.001 m/s$^2$ or more, 0.01 m/s$^2$ to 100 m/s$^2$, 0.05 m/s$^2$ to 100 m/s$^2$, or 0.05 m/s$^2$ to 10 m/s$^2$ is preferred.

In the step for determining the vibration frequency range and amplitude range in step (a), the duration of the applied vibrations is not especially limited, and may be set as appropriate. The method according to the present invention preferably includes applying vibrations of a duration of 1 ms or more to 5 s or less at least once. More preferably, the method according to the present invention includes applying vibrations of a duration of 5 ms to 500 ms at least once.

The number of times of applying vibrations is also not especially limited, and may be set as appropriate. The number of times of applying vibrations is preferably two times or more.

When applying vibrations two times or more, the duration of the respective vibrations and the interval between applying vibrations is not especially limited, and may be set as appropriate. Further, this duration and interval may be the same or set differently for the respective vibrations.

It is preferred that the method according to the present invention includes applying vibrations of a duration of 5 s or less at least once, applying vibrations of a duration of 1 ms or more to 5 s or less at least once, or applying vibrations of a duration of 5 ms to 500 ms or less at least once.

A method in which the interval between applying vibrations is 100 ms or more to 100 s or less is preferred, a method in which this interval is 200 ms to 60 s is more preferred, a method in which this interval is 500 ms to 10 s is still more preferred, and a method in which this interval is 1 s to 3 s is especially preferred.

Further, the waveform of the applied vibrations is not especially limited, and may be either a sine wave or a non-sinusoidal wave, such as a square wave, a triangle wave, or a sawtooth wave.

Step (b) is a step of producing vibrations in the above frequency range and amplitude range once or two or more times in the insect pest habitat medium. The habitat medium is typically an ordinary tree, a fruit tree, an ornamental tree, a garden tree, a bonsai tree, a seedling, a roadside tree, a natural forest, an artificial tree, or a crop, which may each be outdoors or indoors, as well as the structure per se or a contact area of a house and the like.

When applying the vibrations to the habitat medium itself, the vibrations are directly applied to the habitat medium.

The insect pest behavior that is targeted for control is not especially limited. Examples thereof may include search, orientation, arrest, aggregation, feeding, mating, oviposition, escape, freezing, and warning. The site where the vibrations are produced may be the actual habitat medium where the target insect is settled, or may be some other medium that propagates the vibrations to the habitat medium.

The frequency range is not especially limited, and may be set based on the target insect pest species and the behavior that is targeted for control, for example. However, a low frequency range is preferred. Such a frequency is especially preferred against Japanese pine sawyer. More preferred is 10 Hz to 5 kHz, and still more preferred 25 Hz to 1 kHz.

Further, to prevent the insect pest species targeted for control from adaptation to the vibrations, it is effective, and in fact preferred, to apply vibrations which combine two or more values of frequencies, rather than use one single value of frequency.

The vibration amplitude range is not especially limited, and may be set based on the target insect species and the behavior that is targeted for control, for example. A preferred example of this amplitude range is 0.001 m/s$^2$ or more, more preferred is a range of 0.01 m/s$^2$ to 100 m/s$^2$, and still more preferred is a range of 0.05 m/s$^2$ to 10 m/s$^2$.

Therefore, a combination of a frequency range and an amplitude range that combines the above frequency ranges and amplitude ranges is preferred. For example, a combination of a frequency range of 10 Hz to 5 kHz and an amplitude range of 0.01 m/s$^2$ to 100 m/s$^2$ is preferred.

If it is difficult to measure amplitude as a unit of acceleration due to the limitations of the measurement device, the amplitude value can be determined based on the velocity and the frequency of the vibrations in the medium during vibration. Specifically, the following relationship exists among velocity (v), acceleration (a), and frequency (f): $a=(2\pi f)\cdot v$. Therefore, for example, converting a velocity of 0.000000032 m/s at a frequency of 5 kHz gives an acceleration of 0.001 m/s$^2$.

Figure 3:
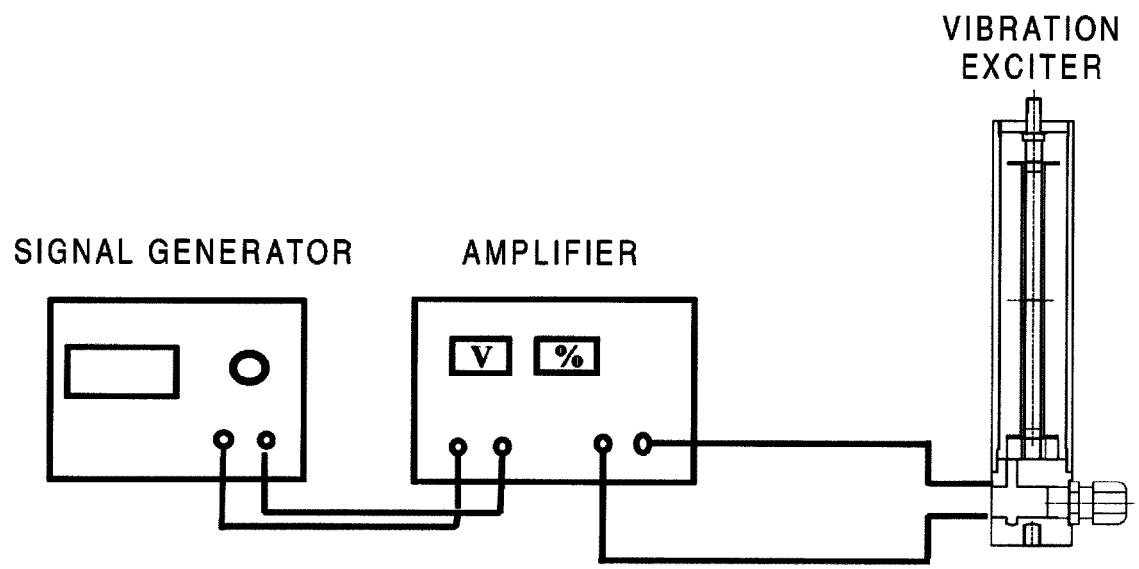
FIG. 3 is a diagram illustrating an example of the vibration exciter used in the present invention.

The method for producing the vibrations is not limited. For example, a vibration exciter or an actuator capable of precisely controlling the vibrations in the vibration frequency range and amplitude range in the insect habitat medium determined in step (a) can be used (FIG. 3).

If the number of habitat media of the target insect is one (a single habitat medium), a single vibration exciter may be used. However, based on the intensity of the required amplitude, multiple vibration exciters can also be used.

Further, if the number of habitat media of the target insect is larger than one (a plurality of habitat media), vibrations may be applied to each habitat medium using multiple vibration exciters, or a smaller number or just one vibration exciter capable of applying a sufficient vibrational force may be used.

In addition, multiple vibration exciters may be used based on the size or the breadth of the habitat medium of the target insect. Alternatively, a smaller number or just one vibration exciter capable of applying a sufficient vibrational force may be used.

For example, if the habitat region of the target insect is a forest or agricultural land, one or two or more vibration exciters can be placed per given area.

Further, if the habitat region of the target insect is a structure such as a single house, one or two or more vibration exciters can be placed at a site where the insect is thought to enter or live, or nearby at a contact area with the structure, for example.

The site for vibrations to be applied may be the habitat medium itself where the target insect is settled, or may be some other medium that propagates the vibrations to the habitat medium. For example, if the habitat medium is a plant or a structure, it is preferred to apply suitable vibrations indirectly to the plant or structure by applying the vibrations to a contact area, such as the land or road surface supporting the plant or structure.

The duration of the applied vibrations is not especially limited, and may be set as appropriate. The method according to the present invention preferably includes applying vibrations of a duration of 5 s or less at least once, applying vibrations of 1 ms or more to 5 s or less at least once, or applying vibrations of 5 ms to 500 ms at least once.

Further, the number of times of applying vibrations is not especially limited, and may be set as appropriate. The number of times of applying vibrations is preferably two times or more.

When applying vibrations two times or more, the interval between applying vibrations is also not especially limited, and may be set as appropriate. A method in which the interval between applying vibrations is 100 ms or more to 100 s or less is preferred, more preferred is an interval of 200 ms to 60 s, still more preferred is an interval of 500 ms to 10 s, and especially preferred is an interval of 1 s to 3 s.

To perform the precise control of the vibrations, it is preferred to use a super-magnetostrictive element. This is because using a super-magnetostrictive element is superior than the electromagnetic shakers that are currently widely used, in terms of allowing a sufficient vibrational force to be applied even on targets spread over a wide area, such as trees and crops, and structures such as houses, as well as enabling more precise frequency control as a result of the broader frequency control range. Further, although there are compact vibration shakers that employ a piezoelectric element, piezoelectric elements require a high voltage in order to run, whereas a super-magnetostrictive element can run on batteries.

In addition, since super-magnetostrictive elements have an equivalent or better durability than piezoelectric elements, even from a cost perspective, a method that uses a super-magnetostrictive element is superior to an insect pest control method that uses chemically synthesized pesticides, for example. Further, a vibration generator that employs a super-magnetostrictive element can also be run by wireless remote operation or by a low-power solar cell. Using a vibration generator that employs a super-magnetostrictive element also allows vibration of a vibration-propagating metals, woods, trees, soil and the like, as well as vibration of a habitat medium via a vibration-propagating object thereof.

Further, if a vibration generator that employs a super-magnetostrictive element is used, it is possible to attach a hard object made from a long flexible stainless steel wire or a ceramic, for example, and generate vibrations that do not produce much attenuation at the tip of the hard object. The generation of such vibrations is advantageous for remote and local targets. Consequently, by using a vibration generator that employs a super-magnetostrictive element, the method according to the present invention that can be applied from localized habitat media to wide-area objects, for example from houses, greenhouses, and warehouses to agricultural land, orchards, and forests. Accordingly, there are no limitations on the habitat media that can be targeted.

Until now, there have been no examples of using a super-magnetostrictive element to control insect behavior. Therefore, the present invention is also highly significant in terms of enabling super-magnetostrictive elements to be preferably used in such applications.

Super-magnetostrictive elements are elements that expand and contract due to changes in magnetic field, and are formed from a lanthanoid element and an iron-group element. Super-magnetostrictive elements are practically used as an actuator or a sensor in mechanical, architecture, medical, and environmental fields.

Magnetostriction is a phenomenon in which magnetic permeability (how easily magnetism passes through an object) changes when the shape of an object is caused to expand and contract due to magnetism. Therefore, a super-magnetostrictive element is an element in which this magnetostriction is strong, with amount of the change reaching 1,500 to 2,000 ppm, and also a high rate of the change in the order of nanoseconds to milliseconds.

Although the insect behavior to be controlled is not especially limited, in the present invention, the behavior is preferably one type or two or more types selected from search, orientation, arrest, aggregation, feeding, mating, oviposition, escape, freezing, and warning.

For example, if the target insect is a pest, and that insect is to be controlled, the behavior to be controlled may be, considering behavior induction and suppression, any of search, orientation, arrest, aggregation, feeding, mating, oviposition, escape, freezing, and warning.

In the method according to the present invention, it is preferred to further include a step of determining a frequency range of the vibrations that occur in the insect habitat medium. Determining such a frequency range enables the frequency range to be applied in step (b) to be determined more precisely.

For example, if spontaneous vibrations are observed in a given type of tree, but such spontaneous vibrations are not at a frequency that has an effect on the behavior on the desired control target, the desired behavior can be more reliably controlled by avoiding or including the frequency of those spontaneous vibrations.

The insect pest that is a control target by the method according to the present invention is not especially limited. Examples may include forest, wood, and fruit tree insect pests, house, sanitary, and stored grain insect pests, or agricultural insect pests.

The chemically synthesized pesticides that are currently commonly used not only have the drawback that they also have an insecticidal effect on other species that are not the target, such as natural enemies, but also lead to problems such as adverse effects on the residents in the surrounding areas and environmental pollution.

In contrast, the method according to the present invention can efficiently control just a specific target in a pinpoint manner by propagating vibrations to a habitat medium based on the characteristics of the target insect pest. More specifically, the method according to the present invention provides an environmentally-friendly control technology that does not have the above-described problems of chemically synthesized pesticides. Further, since the method according to the present invention employs vibrations that are propagated through the habitat medium, it is also environmentally friendly in terms of not producing air-borne noise. In addition, the method according to the present invention is also environmentally friendly in that for short-duration vibrations (e.g., 10 ms or less), it is difficult for people to detect those vibrations.

The method according to the present invention can control insect pests by controlling an insect pest species vibration signal and 1) insect pest guidance and intrusion prevention based on repellence and attraction, 2) inhibiting mating by disturbing, 3) reducing feeding and oviposition, 4) monitoring with attractant traps, and 5) a combination of the inventive method and a known control technology (e.g., a light-based control technology).

The above-mentioned forest and orchard insect pests are not especially limited. Examples may include long-horned beetles, bark beetles, powder-post beetles, and deathwatch beetles. These insect pests are boring pests, which are difficult to control directly with chemically synthesized pesticides. However, the method according to the present invention has an excellent control effect even against such hard-to-control insect pests. Therefore, the inventive method is preferred against one or two or more species of insect pest selected from the Japanese pine sawyer and related species (*Monochamus*), the Asian long-horned beetle and related species (*Anoplophora*), the yellow-spotted longicorn beetle (*Psacothea hilaris*), the mulberry borer (*Apriona japonica*), the cryptomeria bark borer (*Semanotus japonicus*), the oak platypodid beetle and related species (*Platypus*), the spruce bark beetle and related species (*Ips, Dendroctonus*), the powder-post beetle and related species (*Lyctus*), *Nicobium hirtum* and related species (*Nicobium, Ernobius*), the coconut rhinoceros beetle and related species (*Oryctes*), and the Asian citrus psylla and related species (*Diaphorina*).

Forest and orchard insect pests can be controlled by, for example, repelling, inhibiting oviposition, and inhibiting feeding of the insect pest, by placing one or two or more vibration exciters per given area of the forest or orchard where the insect pest lives or is thought to live.

When controlling forest and orchard insect pests, vibrations can be directly applied from the vibration exciter on a damaged tree or fruit tree, or tree or fruit tree that is at risk of being damaged. Further, a preferred method is to apply vibrations to the tree or fruit tree by propagating suitable vibrations on some other medium, such as the soil that is supporting the tree or fruit tree.

The house and sanitary insect pests are also not especially limited. Examples may include termites and cockroaches. The inventive method is preferred against one or two or more species of insect pest selected from among these, and is more preferred against one or two or more species of insect pest selected from the Formosan subterranean termite and related species (*Coptotermes*), the Japanese subterranean termite and related species (*Reticulitermes*), the western drywood termite and related species (*Incisitermes*), the Daikoku drywood termite and related species (*Cryptotermes*), the Nevada dampwood termite (*Zootermopsis nevadensis*), the smoky-brown cockroach, the American cockroach and related species (*Periplaneta*), and the German cockroach and related species (*Blattella*).

House and sanitary insect pests can be controlled by, for example, inhibiting the intrusion of termites or inducing the repellence of termites by placing a vibration exciter at each corner portion near the roof of a house where the insect lives or is thought to live.

Further, control can also be carried out by inhibiting the intrusion of cockroaches and indoor dust mites or inducing the repellence of cockroaches and indoor dust mites by placing a vibration exciter at each corner portion near the base structure of a house where the insect is thought to live.

Agricultural insect pests are not especially limited. Examples thereof include various insect pests, such as grasshoppers, stick insects, crickets, katydids, chafers, weevils, ants, stink bugs, aphids, mites, planthoppers, whiteflies, flies, leaf beetles, moths, and butterflies. The inventive method is preferred against the above vibration-sensitive insect pests.

Agricultural insect pests can be controlled by, for example, repelling, inhibiting oviposition, and inhibiting feeding of the insect pest, by placing one or two or more vibration exciters per given area of agricultural land where the insect pest lives or is thought to live.

Further, an even greater advantageous effect can be obtained by attracting, for example, insects that are beneficial to humans by using the method according to the present invention, which controls insect pest behavior with vibrations, for positive behavior control of an insect.

For example, by applying vibrations that attract natural enemies and predators to the habitat region of the insect that is an insect pest, or that stimulates the oviposition or mating of such natural enemies and predators, the control efficiency by these natural enemies and predators can be increased.

Examples of natural enemies and predators include cylindrical bark beetles, lacewings, ladybugs, bees, flies, spiders and the like.

Further, the production efficiency of honey, for example, by honey bees, which are a domesticated insect, can be increased by controlling their behavior.

Further, the present invention also relates to a method for controlling insect pests, which includes using a super-magnetostrictive element to produce vibrations in the habitat medium of the insect pest. According to this method, as described above, since the frequency control range is very broad, insect pests and habitat media extending over a wide spectrum (ordinary trees, fruit trees, ornamental trees, garden trees, bonsai trees, seedlings, roadside trees, natural forests, artificial forests, and crops, which may each be outdoors or indoors, as well as a structure such as a house) can be controlled.

In this aspect of the method for controlling an insect pest according to the present invention, it is preferred that the frequency range of the vibrations is 5 Hz to 5 kHz and the amplitude range is 0.001 m/s$^2$ or more, as this enables a specific insect pest to be controlled more efficiently. Further, more preferred is a vibration frequency of 25 Hz to 1 kHz.

Further, in this aspect of the method for controlling an insect pest according to the present invention, it is preferred that the insect pest is the Japanese pine sawyer, because this allows the Japanese pine sawyer to be controlled efficiently and safely. More specifically, the method according to the present invention enables the spread of the Japanese pine sawyers infesting pines due to the feeding of the Japanese pine sawyer to be suppressed very efficiently and more safely than chemically synthesized pesticides, thereby allowing damage to pines by the Japanese pine sawyer to be prevented. Consequently, the inventive method can be considered to be a very effective method for pine conservation, which can replace chemical-based control methods.

In this aspect of the method according to the present invention, the method for controlling the various insect pests is the same as the above-described control method, except for using at least one super-magnetostrictive element as a vibration exciter.

For example the duration of the applied vibrations is not especially limited, and may be set as appropriate. The method according to the present invention preferably includes applying vibrations of a duration of 5 s or less at least once, applying vibrations of 1 ms or more to 5 s or less at least once, or applying vibrations of 5 ms to 500 ms at least once.

Further, the number of times of applying vibrations is not especially limited, and may be set as appropriate. The number of times of applying vibrations is preferably two times or more.

When applying vibrations two times or more, the interval between applying vibrations is also not especially limited, and may be set as appropriate. A method in which the interval between applying vibrations is 100 ms or more to 100 s or less is preferred, more preferred is an interval of 200 ms to 60 s, still more preferred is an interval of 500 ms to 10 s, and especially preferred is an interval of 1 s to 3 s.

Further, the site to which the vibrations are applied and the waveforms of the vibrations are not especially limited, and may be appropriately set in consideration of control efficiency and the like.

In the method for controlling an insect pest according to the present invention, as an example of a preferred frequency and number of frequency combination concerning a specific insect pest, for the Japanese pine sawyer, the combination of a frequency range of 5 Hz to 5 kHz and an amplitude range of 0.001 m/s$^2$ or more is preferred, the combination of 25 Hz to 1 kHz and 0.05 to 100 in/s$^2$ is more preferred, and the combination of 100 Hz to 1 kHz and 0.05 to 100 m/s$^2$ is still more preferred. Further, the frequency and number of frequency combinations are also preferred for the Formosan subterranean termite, and most preferred is the combination of 1 kHz and 0.5 m/s$^2$.

However, for any insect pest species, a preferred frequency and amplitude range combination can be set based on any combination of the frequency and number of frequency ranges described in this specification.

The present invention will now be described in more detail based on the following examples. However, this description is merely illustrative, and in no way whatsoever limits the present invention.

EXAMPLES

Example 1

Behavior Control of the Japanese Pine Sawyer and Other Insect Pests with Vibrations Vibration response and associated sensory receptor were explored using adults of the Japanese pine sawyers. A vibration stimulus with a varying amplitude (25 Hz to 10 kHz) generated from an electromagnetic vibration exciter was applied to resting adult of the Japanese pine sawyers, and the presence of warning behavior (leg or antennae movement), freezing, or sound generation behavior was observed. The duration of the vibration stimulus was 100 ms, with an interval of 900 ms. The Japanese pine sawyers exhibited a highly sensitive response to the low frequency component (25 Hz to 1 kHz) (FIG. 1). The behavior threshold for the low frequency component was 3.6 to 23.5 m/s$^2$.

Further, at 100 Hz in the low frequency component, response to a vibration stimulus (0.05 m/s$^2$) having an amplitude smaller than the above threshold was observed. Compared with the control group that was not subjected to the vibration stimulus, individuals that froze their motion during walking and individuals that started to walk from a resting posture were significantly greater (Table 1).

TABLE 1

Walking and Freezing Response of Adult Japanese Pine Sawyer to Vibration Stimulus

| | Ratio of Individual Response (%) | |
|---|---|---|
| | Walking/Freezing | No Response |
| Vibration Stimulus | 48 | 52 |
| No Vibration Stimulus | 9 | 91 |

Behavioral response of individuals that were resting or walking when a 100 Hz, 0.05 m/s$^2$ vibration stimulus (sine wave, duration of 1 s or more) was applied to a branch. A significant difference was found in the number of individual response by Fisher's exact test (P < 0.0001, N = 87).

Figure 2:
FIG. 2 is a photograph showing a chordotonal organ on the leg of a Japanese pine sawyer.

Further, using the Japanese pine sawyers, identification of the femoral chordotonal organ that had developed in the legs as a vibration receptor based on histological observation showed that the organ had a structure in which a sensory cell group is attached to the base of the tibia via a long thin chord (apodeme) (FIG. 2). It was thus considered that the femoral chordotonal organ has a function for receiving vibration stimuli via the contact area of the legs with high sensitivity. This is the first time that a femoral chordotonal organ has been identified from coleopteran insects.

Using individuals from which the femoral chordotonal organ had been removed and intact individuals, the freezing response of walking individuals to a vibration stimulus at a frequency of 20 to 100 Hz was observed. Although the individuals whose chordotonal organ had been removed showed almost no freezing response to the vibration stimulus, a high percentage of the intact individuals froze at 100 Hz and 1,000 Hz (Table 2). This result shows that the femoral chordotonal organ specifically receives vibrations from 100 to 1,000 Hz. Further, similar to the intact individuals, a high ratio (75%) of sham-operated individuals, which had only been subjected to an operation on their epidermis without ablating the chordotonal organ, exhibited a freezing response at 100 Hz.

TABLE 2

Freezing Response of Walking Individuals Whose Chordotonal Organ had been Ablated

| | Freezing Individuals (%) at Each Vibration Stimuli (Hz) | | |
|---|---|---|---|
| Treatment Type | 20 (Hz) | 100* | 1,000* |
| Chordotonal Organ Ablated | 9.5 (%) | 9.5 | 0 |
| Intact | 40 | 95 | 65 |

A 0.05 to 27 m/s2 vibration stimulus (sine wave, duration of 100 ms or more, interval 900 ms) was applied to a branch (N = 11 to 21). A significant difference was found between the treatments at 100 Hz and 1,000 Hz with asterisks (Ryan test, P < 0.001).

Next, it was observed whether vibrations with an amplitude sufficiently greater than the above threshold (1 kHz, 50 m/s$^2$ or more, duration 100 ms, interval 900 ms) had an effect on the number of eggs laid on a small pine log for adult females of this species. The number of eggs oviposited in cases in which a vibration stimulus was applied (mean number of eggs oviposited 1.5) were likely to be lower than that for cases in which a vibration stimulus was not applied (mean number of eggs oviposited 5.0).

Measurement of the vibrations emitted from the larvae living in the pine logs by an accelerometer showed a frequency of 1 kHz and the harmonic frequency of 2 kHz, with an amplitude of 0.002 m/s$^2$ (Table 3).

TABLE 3

Measurement Values of Vibrations Emitted from the Japanese Pine Sawyer Larvae

| | Frequency | Amplitude | Duration (ms) | |
|---|---|---|---|---|
| | (kHz) | (m/s$^2$) | Pulse | Pulse Group |
| Japanese Pine Sawyer Larvae | 1 to 2 | 0.002 | 0.83 | 10 |

In addition, it was observed whether vibrations (100 Hz, 2 m/s$^2$ or more, duration 100 ms, interval 900 ms) having an amplitude at almost the same level as the above threshold had an effect on the number of eggs oviposited by adult females of the species. An oviposition selection test between applied blocks was carried out by releasing 6 females in a container into two habitat media (small logs of the Japanese black pine with 3 to 4 cm in diameter and 35 cm in length), and leaving overnight. Vibrations (100 Hz, 2 m/s$^2$ or more, sine wave, duration 100 ms, interval 900 ms) were applied to one of the habitat media (vibration-applied block), and not applied to the other habitat medium (non-applied block).

The results showed that the Japanese pine sawyer exhibited absolutely no oviposition behavior in the vibration-applied block, indicating that vibrations strongly inhibit oviposition (Table 4) (N=3). Further, at the end of the test, the distribution of the individuals in the non-applied block was a mean of 2.3 individuals, whereas that in the vibration-applied block was 0 individuals (N=3). Moreover, although no feeding was found in the vibration-applied block, in the non-applied block feeding (mean feeding amount 11.6 mm) was found.

TABLE 4

Oviposition Behavior in Vibration-Applied and Non-Applied Blocks

|  | Vibration-Applied Block | Non-Applied Block |
|---|---|---|
| Number of Oviposition Traces | 0 | 20.6 |
| Number of Oviposited Eggs | 0 | 15.0 |

Significant difference found between the two blocks (t test P < 0.01)

On the other hand, adult insects generate sound by rubbing their thoracic region. Measurement of that sound (air-borne sound) with a microphone showed that the frequency band was broad (8 to 20 kHz) (Table 5), and that the amplitude (sound pressure) was sufficiently large. Based on these measurement results, it is considered that the adult sound is also propagated as vibrations on the habitat medium. Since the frequencies of the larval vibrations and the adult sound are included in the range that can be sufficiently received by adults when producing vibrations, these results serves as an important presumption that this species communicates. By controlling these frequencies, amplitudes, and durations, it is possible to disturb the communication between adults and larvae with vibrations.

Therefore, the Japanese pine sawyer can be controlled by applying vibrations to the habitat medium where this insect pest species lives to suppress behaviors such as oviposition, feeding, and mating, and/or induce behaviors such as escape, freezing, and warning.

TABLE 5

Measurement Value of Sound Generated by Adult Japanese Pine Sawyer and Oak Platypodid Beetle

|  | Frequency (kHz) | Duration (ms) | |
|---|---|---|---|
|  |  | Pulse | Pulse Group |
| Adult Japanese Pine Sawyer | 8 to 20 | 0.6 | 390 |
| Adult Oak Platypodid Beetle | 2 to 20 | 0.5 | 58 |

In addition, the oak platypodid beetle, which is a serious insect pest of broadleaf trees, such as oaks, also generates sound by rubbing the tip of its abdomen with its elytron. However, the fact that the oak platypodid beetle communicates using this sound is already known (Non-Patent Document 4). Like the Japanese pine sawyer, since the frequency of this sound covers a broad band (Table 5), and the amplitude (sound pressure) is also large, it is considered that the oak platypodid beetle also communicates using vibrations on the habitat medium produced by sound.

Further, it is known that termites communicate with nest mates by, for example, a tapping behavior, in which they beat their head against the substratum, and a tremulation behavior, in which they oscillate their bodies in a body axis direction (Non-Patent Document 5). Images of these vibration behaviors captured with a high-speed camera were analyzed.

The results showed that the frequency of the tapping behavior performed by the Nevada damp-wood termite workers and soldiers was 24 to 27 Hz, with an acceleration of 2.8 to 5.4 m/s$^2$. Further, the frequency of the tremulation behavior performed by the Japanese subterranean termite workers and soldiers was 25 to 30 Hz, with an acceleration of 0.5 m/s$^2$. The frequency in these vibration behaviors is very different depending on species of termite (Non-Patent Document 6). Therefore, communication disruption that is specific to the termite target species can be achieved by applying a vibration stimulus that induces or suppresses a vibration behavior.

TABLE 6

|  |  |  | Vibration Behavior | |
|---|---|---|---|---|
| Type of Behavior | Species | Caste | Frequency (Hz) | Acceleration (m/s$^2$) |
| Tapping | Nevada Damp-Wood Termite | Worker | 24 | 2.8 |
|  |  | Soldier | 27 | 5.4 |
| Tremulation | Japanese Subterranean Termite | Worker | 30 | 0.5 |
|  |  | Soldier | 25 | 0.5 |

Example 2

Spontaneous Vibration in Pines

The spontaneous vibrations emitted by the Japanese black pine seedlings (4 years old) that were weakened due to pine wood nematode were measured by an accelerometer and an acoustic emission method.

Among these vibrations, the low-frequency component of less than 5 kHz (amplitude 0.002 m/s$^2$ or more) and the high-frequency component, which is in the ultrasonic range, acoustic emission (frequency of 20 kHz or more) (Table 7) increase and decrease in conjunction with changes in the moisture content over time, which is a cause of pine weakening. There have been no previous examples of measuring the low-frequency component, even for other trees.

Next, when vibration analysis was carried out by applying vibrations to a part of the trunk of a seedling of the Japanese black pine, the resonance frequency also changed based on the moisture content (Table 8). Analysis of these spontaneous vibrations and resonance frequency allows the frequency range and amplitude range of the vibrations in the habitat medium to be determined.

TABLE 7

Measurement Values of Spontaneous Vibrations in the Japanese Black Pine

| Vibration Type | Frequency (kHz) | Amplitude (m/s$^2$) | Duration (ms) |
|---|---|---|---|
| Low-Frequency Component | ≤5 | ≥0.002 | ≥5 |
| High-Frequency Component | ≥20 | — | ≥0.1 |

TABLE 8

The Japanese Black Pine Resonance Frequency

| | Resonance Frequency (kHz) | Density (g/cm$^2$) |
|---|---|---|
| Sanitary Tree | 3.32 | 1.05 |
| Dead Tree | 4.07 | 0.67 |

Analysis carried out by subjecting test specimens (1.9 to 2.0 cm in diameter and 28.0 to 30.0 cm in length, mean of 3 to 4 specimens) with both ends free to longitudinal vibration.

In addition, it was observed whether spontaneous vibrations having the above low-frequency component (frequency 100 Hz to 5 kHz, duration 100 ms, 0.5 m/s$^2$, interval 970 ms, interval 1,000 ms) had an effect on the behavioral response of adult females of the species. More specifically, the existence of an arrest behavior (freezing in the habitat medium without oviposition for 5 minutes or more) and an oviposition behavior were observed in cases where vibrations were and were not applied to the habitat medium (a small log of the Japanese black pine 3 to 4 cm in diameter and 35 cm in length). Further, it was also confirmed whether eggs were present after oviposition.

Based on the results, it was indicated that although arrest is promoted by the spontaneous vibrations of the Japanese pine sawyer, the oviposition percentage (presence of eggs) does not change (Table 9). Therefore, the spontaneous vibrations can be considered to induce arrest without inhibiting oviposition.

TABLE 9

Behavioral Response of the Japanese Pine Sawyer to Spontaneous Vibrations

| | Percentage of Individual Response (%) | | |
|---|---|---|---|
| Spontaneous | | Oviposition | |
| Vibrations | Arrest | With Eggs | No Eggs |
| Presence | 33 | 62 | 5 |
| Absence | 7 | 90 | 3 |

A significant difference was found based on Fisher's exact test (N = 30 to 39, P = 0.01).

Example 3

Control Model Test Based on Behavior Control of the Japanese Pine Sawyer and Formosan Subterranean Termite Using a Super-Magnetostrictive Element (1) The behavioral response of the Japanese pine sawyer to localized vibration using a super-magnetostrictive element was observed (Table 10).

Vibrations (100 Hz, 5 m/s$^2$, sine wave, stimulus time 1 s or more) were applied by a vibration exciter using a signal generator, an amplifier, and a super-magnetostrictive element (FIG. 3) via a steel wire to the femur of a leg having a chordotonal organ (FIG. 2). A large number of individuals at resting posture was significantly observed that exhibited an escape behavior or a sound-generating behavior, and of individuals that moved their legs and antennae. Individuals showing no response to the vibrations were not observed (Table 10).

On the other hand, as a control group, when touched with a steel wire without applying vibrations, most of the individuals showed no response, and they continued moving their legs or antennae, or continued resting. Hardly any individuals were observed that exhibited an escape behavior or a sound-generating behavior (Table 10).

Based on the above results, this species is considered to exhibit an escape or a warning response by sensing vibrations with the femur having a chordotonal organ.

TABLE 10

Behavior Control of the Japanese Pine Sawyer by Vibrations Using a Super-Magnetostrictive Element

| | Percentage of Individual Response (%) | | |
|---|---|---|---|
| | Escape/Sound Generation | Leg/Antennae Movement | No Response |
| With Vibrations | 60 | 100 | 0 |
| Without Vibrations | 5 | 70 | 30 |

A significant difference was found in the number of individual response by Fisher's exact test (P < 0.001, N = 20).

(2) Next, a control model test based on vibrations that cause feeding inhibition was performed, and a comparison with the control model test was also carried out using a chemical agent.

A feeding selection test between blocks was carried out for 2 hours (N=10) by applying vibrations (100 Hz, 2 m/s$^2$, sine wave, duration 100 ms, interval 900 ms) to one (vibration-applied block) of two habitat media (small branches of the Japanese black pine) with a super-magnetostrictive element, but not to the other (non-applied block).

The results showed that the Japanese pine sawyer was likely to avoid feeding in the vibration-applied block, and it was thus indicated that vibrations inhibit feeding (Table 11).

A feeding selection test between blocks was carried out by releasing 20 females into an outdoor net enclosure, and leaving overnight. Vibrations (100 Hz, 2 m/s$^2$ or more, sine wave, duration 100 ms, interval 900 ms) were applied (vibration-applied block) to one of two habitat media (potted seedlings of the Japanese black pine, 4-year old), and not applied to the other habitat medium (non-applied block).

The results showed that the Japanese pine sawyer was likely to avoid feeding in the vibration-applied block, and it was thus indicated that vibrations inhibit feeding (Table 11) (N=15).

In addition, the feeding amount (mean length 27 mm) in the vibration-applied block was about half that in the non-applied block, thereby confirming that vibrations inhibit feeding.

TABLE 11

| | Feeding Individuals (%) | |
|---|---|---|
| Test | Applied Block | Non-Applied Block |
| Vibrations | 27 | 73 |

The number of feeding individuals was significantly different between the blocks (chi-squared test, P < 0.05).

Next, the same feeding selection test as for the vibration control model was carried out for 2 hours using a commercially-available chemical agent (acetamiprid) that is used for preventing feeding of the Japanese pine sawyer.

A feeding prevention chemical agent (solution of 18% acetamiprid, diluted with water by a factor of 15,000) was coated on one (chemical agent-applied block) of two habitat media (small logs of the Japanese black pine), but just water was coated on the other (N=9). The results showed that the Japanese pine sawyer was not likely to avoid feeding in the chemical agent-applied block, with at least half of the individuals feeding (Table 12).

It is noted that since individuals in the chemical agent-applied block stopped feeding due to chemical paralysis, there were no individuals having a large feeding amount (feeding area 25 mm$^2$ or more) in the chemical agent-applied block. Consequently, the feeding amount of the chemical agent-applied block was likely to be smaller than the vibration-applied block and the non-applied block.

As described above, it is clear that vibrations are able to inhibit feeding of the Japanese pine sawyer. Further, according to the results of the vibration-based tests and the chemical-based test, the feeding frequency (percentage of feeding individuals) was significantly different, and feeding inhibitory effect by vibrations was found to depend on a repellence action (Table 12).

Specifically, the method of the present invention can repel the Japanese pine sawyer, so that the number of feeding individuals of the Japanese pine sawyer can be reduced more than the chemical-based method.

Therefore, the method according to the present invention enables the spread of the Japanese pine sawyers infesting pines due to the feeding of the Japanese pine sawyer to be suppressed very efficiently and safely, thereby allowing damage to pines by the Japanese pine sawyer to be prevented. Consequently, the present method is considered to be very effective method for pine conservation, which can replace chemical-based control methods.

TABLE 12

Feeding Individuals and Feeding Amount in Applied and Non-Applied Block in Vibration Test and Chemical Agent Test

| | Percentage of Feeding Individuals (%) | | |
| --- | --- | --- | --- |
| | Applied Block | | |
| Test | Low Feeding Amount | High Feeding Amount | Non-Applied block High Feeding Amount |
| Vibrations | 0 | 20 | 80 |
| Chemical Agent | 56 | 0 | 44 |

High feeding amount: Feeding area of 25 mm$^2$ or more in 2 hours.
Low feeding amount: Feeding area of less than 25 mm$^2$.
All individuals in non-applied block were high feeding amount. The number of feeding individuals in the applied block and the non-applied block showed a significant difference between the respective tests (Fisher's exact test, P < 0.05).

Using a super-magnetostrictive element, vibrations were applied to a habitat medium (small balsa sheet), and the behavioral response (escape, warning) of the Formosan subterranean termites was observed. The minimum amplitude threshold for inducing a response was measured (two replicates) by applying vibrations (sine wave, duration 100 ms, interval 900 ms) with three different frequencies (50 Hz, 1 kHz, 5 kHz) on 50 individuals (mixture of workers and soldiers), while varying the amplitude between 0.05 and 24 m/s$^2$.

These results indicated that the threshold for 1 kHz was the lowest and that the termites exhibit behavioral response to 1 kHz with high sensitivity. In contrast, the threshold for 50 Hz and 5 kHz was high, meaning that sensitivity was lower than for 1 kHz (Table 13).

The above results suggest that 1 kHz is a specific frequency for controlling the Formosan subterranean termite behavior, and that application of the vibrations with the frequency is able to disrupt termite communication and Prevent intrusion.

TABLE 13

Vibration Amplitude Threshold for Inducing the Formosan Subterranean Termite Behavioral Response

| | Vibration Stimulus (Hz) | | |
| --- | --- | --- | --- |
| Threshold | 50 | 1,000 | 5,000 |
| Amplitude (m/s$^2$) | 24 | 0.05 | 15 |

Based on the above results, a vibration-based control model test was carried out on the Formosan subterranean termites, and a chemical-based comparison with the control model was also carried out.

A selection test between applied blocks was carried out for 1 minute by applying vibrations (1 kHz, 15 m/s$^2$, sine wave, duration 100 ms, interval 900 ms) to one of two habitat media (cryptomeria scantling) with a super-magnetostrictive element (vibration-applied block), and not applying to the other habitat medium (non-applied block) (N=136 to 157, 3 replicates).

The results showed an escape behavior from the vibration-applied block, and a significant increase in the number of individuals moving to the non-applied block during the 1 minute (Table 14).

Next, a selection test similar to the vibration control test was carried out for 1 minute using a repelling agent (citronellal, Patent Document 3). The repelling agent (0.9 mL of a citronellal solution diluted with water by a factor of 10,000) was coated on one of two habitat media (cryptomeria sapwood) (chemical agent-applied block), while the other habitat medium was just coated with water as the non-applied block (N=78 to 80, 3 replicates). The results showed that the termites significantly moved from the chemical agent-applied block to the non-applied block.

The repelling effect in the vibration-based test and the chemical-based test was equivalent, thus suggesting that the vibration-based control according to the present invention is effective.

TABLE 14

Distribution of Individuals in Applied Block and Non-Applied Block in Vibration-Based Test and Chemical-Based Test

| | Mean Ratio of Distributed Individuals (%) | |
| --- | --- | --- |
| Test | Applied Block | Non-Applied Block |
| Vibration | 32 | 68 |
| Chemical | 33 | 67 |

A significant difference was found in the number of distributed individuals between the applied block and non-applied block in the two tests (t test, P < 0.01).

The above results are experimental evidence that the Japanese pine sawyer as well as other insect pests can be controlled by applying vibrations to a habitat medium. Further, it is also suggested that vibrations exhibit a control effect that is equivalent to or better than chemical agents against at least the Japanese pine sawyer and the Formosan subterranean termite.

The above results are experimental evidence that the Japanese pine sawyer as well as other insect pests can be controlled by applying vibrations to a habitat medium. Further, it is also suggested that vibrations produced by a super-magnetostrictive element that uses at least a super-magnetostrictive element exhibit a control effect that is equivalent to or better than chemical agents against at least the Japanese pine sawyer and the Formosan subterranean termite.

Industrial Applicability

The present invention enables insect behavior to be controlled. More specifically, the present invention can be applied not only to control insect pests, but also to attract natural enemy insects, for example. In addition, the present invention can also be applied in the conservation and management of rare species. It is considered that the present invention can make a great contribution to the development of environmentally-friendly control technologies as a substitute for chemical agents. Therefore, the present invention will greatly contribute to the development of the insect pest control industry as well as environmental conservation and related industries.

The invention claimed is:

1. A method for controlling an insect pest with vibrations, comprising:
   a step of determining a frequency range and an amplitude range of vibrations in a habitat medium of a pest that induce or suppress a specific behavior of the pest; and
   a step of controlling the pest behavior by applying vibrations in the frequency range and amplitude range once or two or more times in the insect pest habitat medium, wherein the amplitude range is 0.001 m/s$^2$ or more.

2. The method according to claim 1, wherein the frequency range is 5 Hz to 5 kHz.

3. The method according to claim 2, wherein the frequency range is 25 Hz to 1 kHz.

4. The method according to claim 1, wherein the amplitude range is 0.05 m/s$^2$ to 100 m/s$^2$.

5. The method according to claim 1, wherein vibrations of a duration of 5 s or less are applied at least once.

6. The method according to claim 1 which applies vibrations two or more times, wherein an interval between applying vibrations is 100 ms or more to 100 s or less.

7. The method according to claim 1, wherein vibrations are directly applied to the habitat medium.

8. The method according to claim 1, wherein the habitat medium is a plant or a structure, and vibrations are applied to the plant or structure by applying vibrations to a contact area supporting the plant or structure.

9. The method according to claim 1, wherein the vibrations are applied to the habitat medium of an insect using a supermagnetostrictive element.

10. The method according to claim 1, wherein the insect pest behavior that is controlled is one type or two or more types selected from search, orientation, arrest, aggregation, feeding, mating, oviposition, escape, freezing, and warning.

11. The method according to claim 1, further comprising a step of determining a frequency range of vibrations that occur in a habitat medium of the pest.

12. The method according to claim 1, wherein the insect pest is a forest, wood, or fruit tree insect pest, sanitary, or stored grain insect pest, or an agricultural insect pest.

13. The method according to claim 12, wherein the insect pest is a long-horned beetle, a bark beetle, an ambrosia beetle, a powder-post beetle, a deathwatch beetle, a rhinoceros beetle, or a psylla.

14. The method according to claim 13, wherein the insect pest is one or two or more species of insect pest selected from the Japanese pine sawyer and related species (*Monochamus*), the Asian long-horned beetle and related species (*Anoplophora*), the yellow-spotted longicorn beetle (*Psacothea hilaris*), the mulberry borer (*Apriona japonica*), the cryptomeria bark borer (*Semanotus japonicus*), the oak platypodid beetle and related species (*Platypus*), the spruce bark beetle and related species (*Ips, Dendroctonus*), the powder-post beetle and related species (*Lyctus*), *Nicobium hirtum* and related species (*Nicobium, Ernobius*), the coconut rhinoceros beetle and related species (*Oryctes*), and the citrus psylla and related species (*Diaphorina*).

15. The method according to claim 1, wherein the insect pest is a cockroach.

16. The method according to claim 15, wherein the insect pest is one or two or more species of insect pest selected from the smoky-brown cockroach, the American cockroach and related species (*Periplaneta*), and the German cockroach and related species (*Blattella*).

* * * * *